United States Patent
Klose

(10) Patent No.: US 11,971,350 B2
(45) Date of Patent: Apr. 30, 2024

(54) METHOD AND THZ MEASURING DEVICE FOR MEASURING A MEASUREMENT OBJECT USING ELECTRO-MAGNETIC RADIATION

(71) Applicant: INOEX GMBH INNOVATIONEN UND AUSRÜSTUNGEN FÜR DIE EXTRUSIONSTECHNIK, Melle (DE)

(72) Inventor: Ralph Klose, Melle (DE)

(73) Assignee: 1NOEX GMBH INNOVATIONEN UND AUSRÜSTUNGEN FÜR DIE EXTRUSIONSTECHNIK, Melle (DE)

( * ) Notice: Subject to any disclaimer, the term of this patent is extended or adjusted under 35 U.S.C. 154(b) by 619 days.

(21) Appl. No.: 17/048,387

(22) PCT Filed: Apr. 18, 2019

(86) PCT No.: PCT/DE2019/100366
§ 371 (c)(1),
(2) Date: Oct. 16, 2020

(87) PCT Pub. No.: WO2019/201396
PCT Pub. Date: Oct. 24, 2019

(65) Prior Publication Data
US 2021/0247306 A1    Aug. 12, 2021

(30) Foreign Application Priority Data

Apr. 18, 2018  (DE) .......................... 102018109250.4

(51) Int. Cl.
*G01N 21/3581* (2014.01)
*G01B 11/06* (2006.01)
*G01S 17/08* (2006.01)

(52) U.S. Cl.
CPC ......... *G01N 21/3581* (2013.01); *G01B 11/06* (2013.01); *G01S 17/08* (2013.01)

(58) Field of Classification Search
CPC .................................................. G01N 21/3581
See application file for complete search history.

(56) References Cited

U.S. PATENT DOCUMENTS

| 7,550,734 | B1 * | 6/2009 | Lee | ........................ | H01S 5/0604 |
| | | | | | 250/370.12 |
| 2003/0184328 | A1 * | 10/2003 | Lee | ....................... | G01R 31/311 |
| | | | | | 324/754.23 |

(Continued)

OTHER PUBLICATIONS

International Search Report and Written Opinion for PCT/DE2019/100366 dated Jun. 21, 2019.

(Continued)

*Primary Examiner* — David P Porta
*Assistant Examiner* — Djura Malevic
(74) *Attorney, Agent, or Firm* — Barnes & Thornburg LLP

(57) ABSTRACT

The invention relates to a method for THz measuring a measurement object (3), including at least the following steps:
  phase or a pre-measurement, in which e.g. a first THz transmission beam (112) of a THz transceiver of a THz measuring device (2) is emitted at a first frequency range and having a first bandwidth along an optical axis towards the measurement object (3) and THz radiation reflected from a boundary surface of the measurement object (3) is detected,
  determining, whether a measurement object (3) has been detected,
  if the measurement object (3) has been detected, determining a current distance of the THz measuring devices (2) or the THz transceiver from the boundary surface (St5),
  comparing the determined des current distance with a distance limit, and (Continued)

Figure 1:
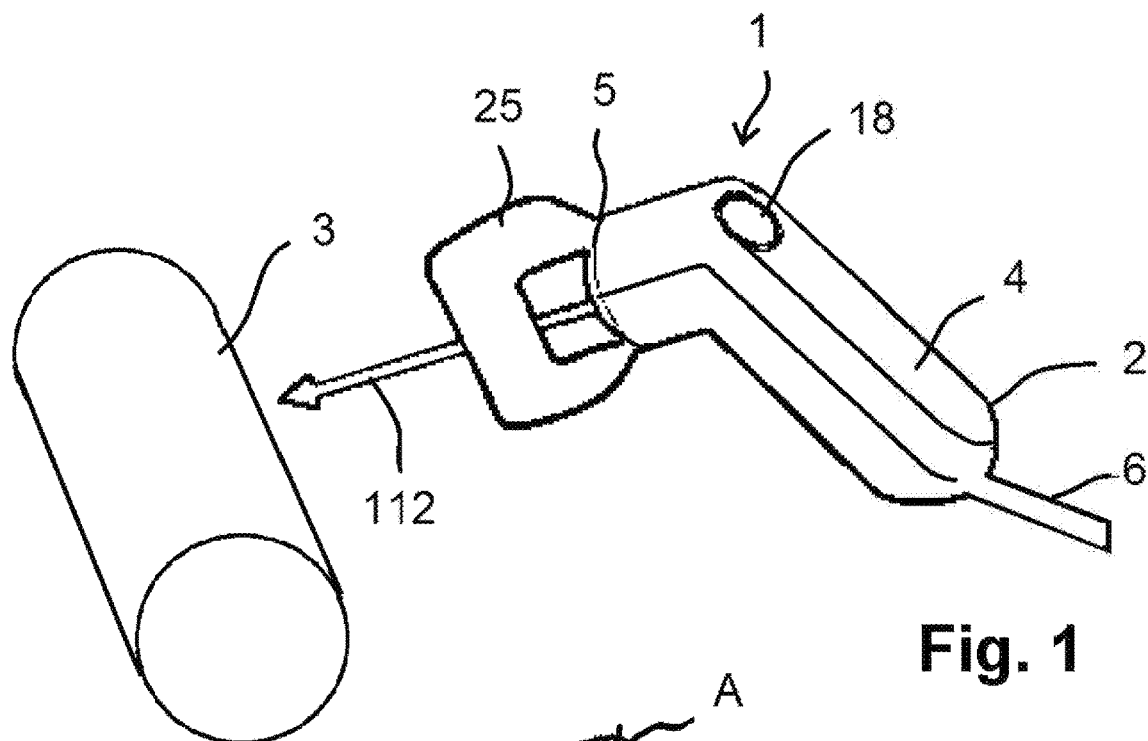

when the distance limit has not been exceeded, subsequent initiation of a main measurement or indication of an initiation of the main measurement, phase of the main measurement, in which a main measurement THZ transmission beam is emitted along the optical axis towards the measurement object and reflected THz radiation is detected, whereby, preferably, a second bandwidth of the main measurement THZ transmission beam is wider than the first bandwidth, whereby measured characteristics, e.g. a layer thickness or material composition, are determined from the emitted main measurement THZ transmission beam and the detected reflected THz radiation, putting out the measurement result.

18 Claims, 2 Drawing Sheets

(56) References Cited

U.S. PATENT DOCUMENTS

| | | | | |
|---|---|---|---|---|
| 2005/0179905 A1* | 8/2005 | Ohtake | .............. | G01N 21/3586 356/450 |
| 2006/0016997 A1* | 1/2006 | Siegel | ................ | G01N 21/3581 356/51 |
| 2008/0157750 A1* | 7/2008 | Li | ...................... | G01N 21/3586 324/76.21 |
| 2008/0179526 A1* | 7/2008 | Xu | ............................ | G01J 3/42 250/341.7 |
| 2009/0283680 A1* | 11/2009 | Logan, Jr. | ................. | G01J 3/42 250/339.07 |
| 2011/0080580 A1* | 4/2011 | Fermann | ................ | G01N 21/65 372/18 |
| 2012/0326039 A1* | 12/2012 | Demers | .............. | G01N 21/3581 250/338.4 |
| 2015/0060673 A1* | 3/2015 | Zimdars | ............... | G01V 5/0016 250/341.2 |
| 2015/0212060 A1 | 7/2015 | Van Mechelen et al. | | |
| 2017/0146453 A1* | 5/2017 | Giles | .................... | A61B 1/0017 |

OTHER PUBLICATIONS

Inoex Gmbh. "WARP portable Erstes THz-basiertes Handgerat zur Wanddicken-und 3.16 Durchmessermessung von Kunststoffrohren" Extrusion, Jun. 1, 2017 (Jun. 1, 2017); pp. 24-25; retrieved from the Internet: https://www.extrusion-info.com/upload/magazines/extrusion/4-2017/files/assets/common/downloads/Extrusion%204-2017.pdf [retrieved on Jun. 19, 2019].

* cited by examiner

METHOD AND THZ MEASURING DEVICE FOR MEASURING A MEASUREMENT OBJECT USING ELECTRO-MAGNETIC RADIATION

CROSS REFERENCE TO RELATED APPLICATIONS

This application is a U.S. national stage application under 35 U.S.C. § 371(b) of International Application No. PCT/DE2019/100366 filed Apr. 18, 2019, which claims priority to German Patent Application No. 102018109250.4 filed on Apr. 18, 2018, the disclosures of both of which are hereby expressly incorporated by reference in their entirety.

The invention relates to a method for measuring a measurement object using electromagnetic radiation, as well as a corresponding measuring device.

THz measuring devices for measuring distances and layer thicknesses emit THz radiation e.g. in the frequency range of 0.01 to 10 THz and are able to detect THz radiation reflected off of measurement objects. This allows detection of distances from boundary surfaces from the THz measuring device, e.g. directly as runtime measurements, or, in the case of frequency modulation, also as frequency shift. Thus, the spectral range actually extends into the millimetre wavelength range.

This allow measuring e.g. plastics pipes directly following their extrusion so as to contactless detect irregularities of the layer thicknesses. Hereby, the THz radiation is partially reflected off the boundary surfaces because the material of the measurement objects, such as e.g. plastics, exhibits a higher refraction index compared to the surrounding air.

The resolution of the THz measuring devices depends upon their physical measuring principle and the modulation. Optical measuring devices, e.g. using short period lasers and transmitting and receiving antennas excited thereby allow for broad band measurements and high resolution of the layer thicknesses. Accordingly, however, they require complex equipment and are expensive. Fully electronic THz measuring devices in general comprise transmitter and receiver dipoles which send and receive the THz radiation; often, they are operated in frequency modulation or as pulsed radiation. Hereby, higher resolutions for detecting smaller distances often require wide band widths of the frequency ranges used. Such wide band widths, however, may interfere with other processes in which data communications or examinations in pre-determined frequency ranges occur. Thus, in general, open examinations using non-directional, freely emitted radiation without exterior screens are limited to pre-determined frequency ranges, e.g. ISM (industrial, scientific, medical) applications, unless a screen or exterior encapsulation, e.g. by means of an exterior housing, can be demonstrated.

The invention is based on the object to create a method for THz measuring measurement objects and a THz measuring device allowing for securely measuring measurement objects, in particular obtaining layer thickness measurements of e.g. tube-shaped or cylindrical measurement objects, with little effort.

This task is solved by a THz measuring method and a THz measuring device according to the independent claims. Preferred further developments are described in the subclaims.

The THz measuring device according to the invention is intended, in particular, for carrying out a THz measuring method according to the invention; the method according to the invention can be carried out, in particular, using the THz measuring device according to the invention.

Hereby, the phases of a pre-measurement and a main measurement are provided. The pre-measurement serves to detect a measurement object and to determine a distance of the measurement object from the THz measuring device from its THz transceiver respectively. In the pre-measurement it is determined, in particular, whether the determined distance of the measurement object or, respectively its outer boundary surface is lower than a distance limit.

Thus, the phase of pre-measurement comprises, in particular, the following steps:
determining whether a measurement object has been detected,
if the measurement object has been detected, determining a current distance of the THz measuring devices or the THz transceiver from the boundary surface,
comparing the current distance with a distance limit, and
when the distance limit has not been exceeded, subsequent initiation of a main measurement or indication of an initiation of the main measurement.

If a measurement object has been detected and it is further determined that the distance limit has not been exceeded, subsequently, the main measurement is initiated directly or it is indicated to the user that he can initiate the main measurement.

Then, in the main measurement, a measurement is carried out using a main measurement THz transmission beam having a main measurement bandwidth. Then, in the main measurement, e.g. the layer thickness, e.g. a wall thickness of a plastic pipe, is determined with high precision. However, further or alternatively to a wall thickness measurement, other measurements of the geometric properties or even spectroscopic examinations or analyses may be carried out also.

According to a preferred embodiment, in the pre-measurement, firstly, a first THz transmission beam having a smaller first bandwidth is put out. Then, in the main measurement, the measurement using the main measurement THz transmission beam is carried out, which, therefore, represents a second THz transmission beam, having the main measurement bandwidth, which, therefore, represents a second bandwidth, whereby said second bandwidth or main measurement bandwidth respectively is larger than the first bandwidth.

In the phase of pre-measurement the THz measuring device will possibly be still far away from the measurement object so that the emitted THz radiation may objectionably proceed past the measurement object and possibly have negative effects in the surroundings. Thus, the invention provides for limiting the bandwidth in this phase of pre-measurement because for the detection of the measurement object only a rough determination of the distance is required; basically, an estimation that the distance limit is not exceeded is sufficient.

If it is determined that the distance limit is not exceeded, the THz radiation emitted by the THz measuring device cannot proceed objectionably past the measurement object and cause direct negative effects in the surrounding region; rather, with a high degree of certainty, the THz radiation is irradiated into the measurement object reflected or dispersed respectively or even absorbed therein. Therefore, in the phase of main measurement, it is possible to select the wider second bandwidth which enables a higher resolution, in particular, also a more precise determination of the layer thickness.

In the case of a fully electronic measuring device, in the phase of pre-measurement e.g. a bandwidth of 1 GHz can be selected; in the phase of main measurement a higher bandwidth of e.g. 20, 30 or 40 GHz, but even much higher, e.g. 1000 GHz or more may be chosen.

The frequency of the THz radiation may lie, in particular, in the frequency range of between 0.01 and 10 THz, both with the measuring device and in the procedure.

Thus, the wavelength range of the THz radiation may be referred to as terahertz radiation, microwave radiation or even radar radiation.

Thus, according to the invention, e.g. even measurements with high bandwidth without exterior shielding are possible. Hereby, for one thing, it is possible to widen the bandwidth; thus, in the phase of pre-measurement a frequency range or a narrow band ISM range may be selected, and subsequently, in the main measurement, a wider frequency range around the frequencies of the first measurement. Further, however, in the main measurement other frequency ranges may be chosen also, e.g. other, wider band frequency ranges. In addition hereto or in the alternative, it is also possible to increase the output or intensity respectively in the phase of the main measurement.

According to the invention, in particular, a portable measuring device may be utilised which, therefore, can be freely handled and positioned by the user in the phase of pre-measurement. As soon as the user has correctly positioned the measuring device, e.g. perpendicular to the boundary surfaces of the measurement object and within the distance limit, this is detected and indicated by the controller device or, respectively, the main measurement is carried out immediately.

Thus, according to this preferred embodiment, the method for THz measuring a measurement object comprises at least the following steps:
  phase of a pre-measurement (I), in which a first THz transmission beam of a THz transceiver of a THz measuring devices is emitted in a first frequency range and having a first bandwidth along an optical axis towards the measurement object and THz radiation reflected from a boundary surface of the measurement object is detected (step St3),
  determining whether a measurement object has been detected (step St4),
  if the measurement object has been detected, determining a current distance of the THz measuring devices or the THz transceiver from the boundary surface (step St5),
  comparing the determined current distance with a distance limit (step St6), and
  if the distance limit has not been exceeded (step St8), subsequently imitating a main measurement (II) or indicating the initiation of the main measurement (II),
  phase of main measurement (II), in which a second THz transmission beam having a second bandwidth, which is wider than the first bandwidth, is irradiated along the optical axis towards the measurement object and reflected THz radiation is detected (step St9),
  whereby, using the emitted second THz transmission beam and the detected reflected THz radiation, a measurement of geometric characteristics or material characteristics of the measurement object is carried out (step St10),
  putting out the measurement result (step St11).

According to the preferred embodiment, the measuring device exhibits the following features:
  THz measuring device for measuring a measurement object,
  said THz measuring device comprising:
  a THz, transceiver for emitting THz radiation along an optical axis and receiving reflected THz radiation,
  a controller device for collecting measurement signals of the THz transceivers and determining a distance and a measurement result of the measurement object, and
  an output device for putting out a measurement result, characterised in that
  the THz measuring device is portable and comprises a grip region for being grabbed and handled by a user,
  said controller device being configured,
  to emit, in a phase of pre-measurement, the THz measuring radiation as a first THz transmission beam along the optical axis having a first bandwidth, and, in a phase of main measurement (II), as a second THz transmission beam having a second bandwidth, which is wider than the first bandwidth, for a higher resolution,
  said controller device determining in the pre-measurement (I) whether a measurement object has been detected and, if the measurement object has been detected, determining the distance of the THz measuring devices or the THz transceivers from a boundary surface of the measurement object and comparing the same with a distance limit and, depending on the comparison, initiates or indicates the main measurement when the distance limit has not been exceeded,
  and said controller device being configured to determine measurement characteristics of the measurement object in the main measurement.

Alternative to this embodiment, utilising a pre-measurement with measuring with a lower bandwidth, however, the pre-measurement may be carried out by a further sensor, e.g.
  a laser-distance sensor device determining the distance e.g. by triangulation, or even
  an ultrasound sensor determining the distance by putting our an ultrasound transmission signal and picking up an ultrasound reflection signal,
  or even a contact sensor that may be protruding a little and is depressed as a button upon contact with the measurement object.

Furthermore, the phase of pre-measurement may be subdivided into
  a searching phase, until the measurement object has been detected; thus, in the searching phase e.g. no reflected THz radiation is detected yet because the distance is too large or the boundary surfaces do not lied perpendicular to the emitted THZ radiation;
  a detection phase, in which the measurement object is detected but the distance limit has not yet been reached and/or the angle of the optical axis does not yet lied sufficiently perpendicular to the boundary surfaces.

In the phase of pre-measurement a measurement may be carried out continuously; in the phase of main measurement, a measurement, e.g. a distance or layer thickness measurement respectively, may e.g. be carried out only at times.

The phases and/or results may be indicated to the user continuously, e.g. on an optical display device or even acoustically. Thus, the user may e.g. grab the measuring device at its grip region, direct it towards the measurement object, and, by pressing an actuator device, start the phase of pre-measurement. Hereby, he may e.g. first receive an indication of the searching phase so that he knows that the measuring device is not yet being held correctly or, respectively, positioned not precisely or too far. Thus ; when the detection phase is indicated the user will position the measuring device even more precise or closer until the measuring phase is indicated and/or commences already.

Thus, the user may e.g. in the case of a portable measuring device run a suitable contact surface along the measurement object and continuously carry out measurements; if he at times holds the portable measuring device imprecisely or leaves the surface, e.g. by tilting the measuring device, maybe because he does not precisely follow the surface contours while running along the round surface, this will be indicated to the user immediately, e.g. by means of a red indicator for the phase of pre-measurement. The user may then reposition the measuring device more precisely and continue the main measurement.

Hereby, the portable measuring device may in particular comprise a contact contour at its front end region, preferably at a deflector. Thus, the deflector, for one thing, will keep disturbing THz radiation away from the THz transceiver, and, for another, facilitate exact positioning on the measurement object by means of contour lines. Hereby, e.g. pairs of contour lines may be present that enable suitable positionings on measurement objects with defined curvatures, such as plastic pipes with defined diameters. Thus, several pairs of contour lines on the front of the shaped panel may serve to establish contact correctly; as soon as the user tilts the portable measuring device it will be indicated to the user as phase of pre-measurement because the reflected THz beam will not be returned or the distance will become too large.

Thus, even using a portable measuring device, simple handling by the user and precise measurements are possible, in particular even high precision layer thickness measurements, with little effort.

Figure 2:
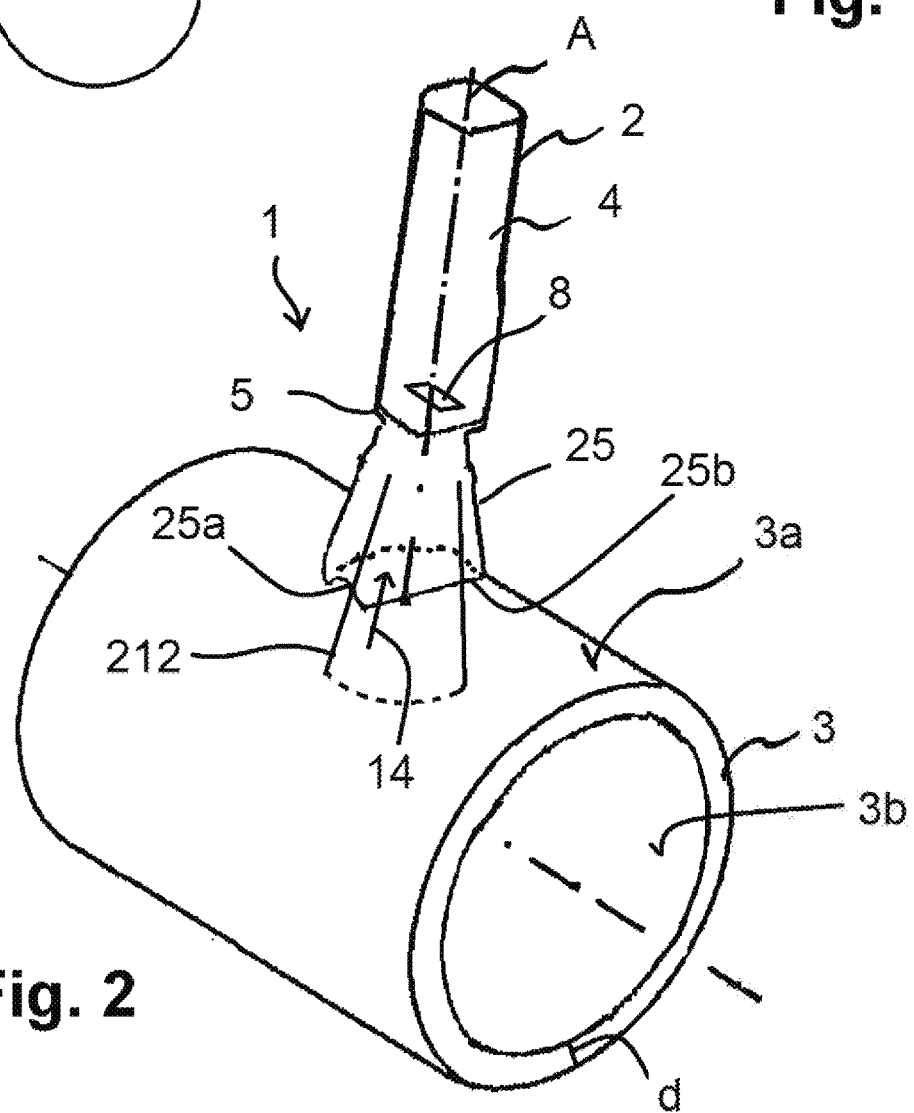
Figure 3:
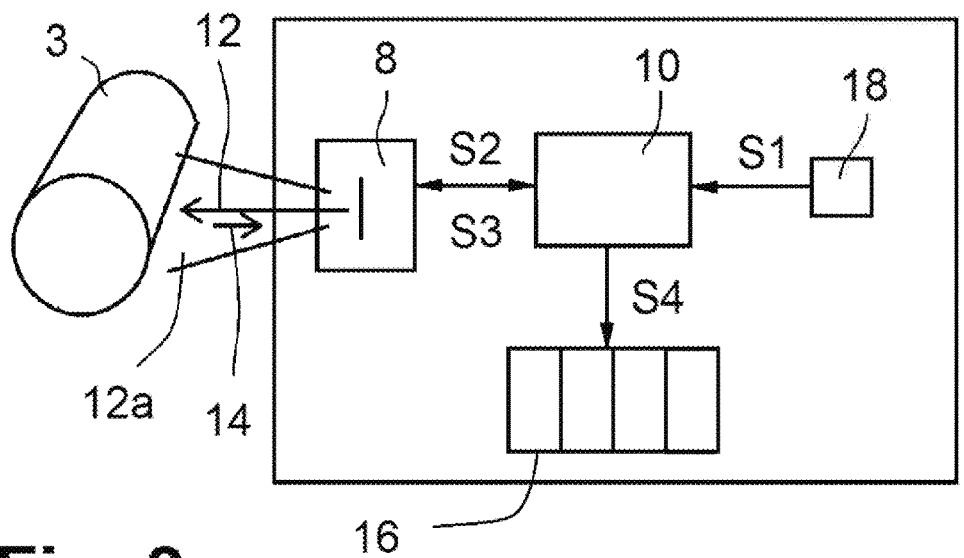

The invention is further illustrated below by means of the accompanying drawings by means of a few embodiments. Therein is shown:

FIG. 1 a perspective view of a measuring array with a portable THz measuring device in the phase of pre-measurement;

FIG. 2 a measuring array with a portable THz measuring device in the phase of main measurement;

FIG. 3 a block schematic diagram of the measuring array, and

Figure 4:
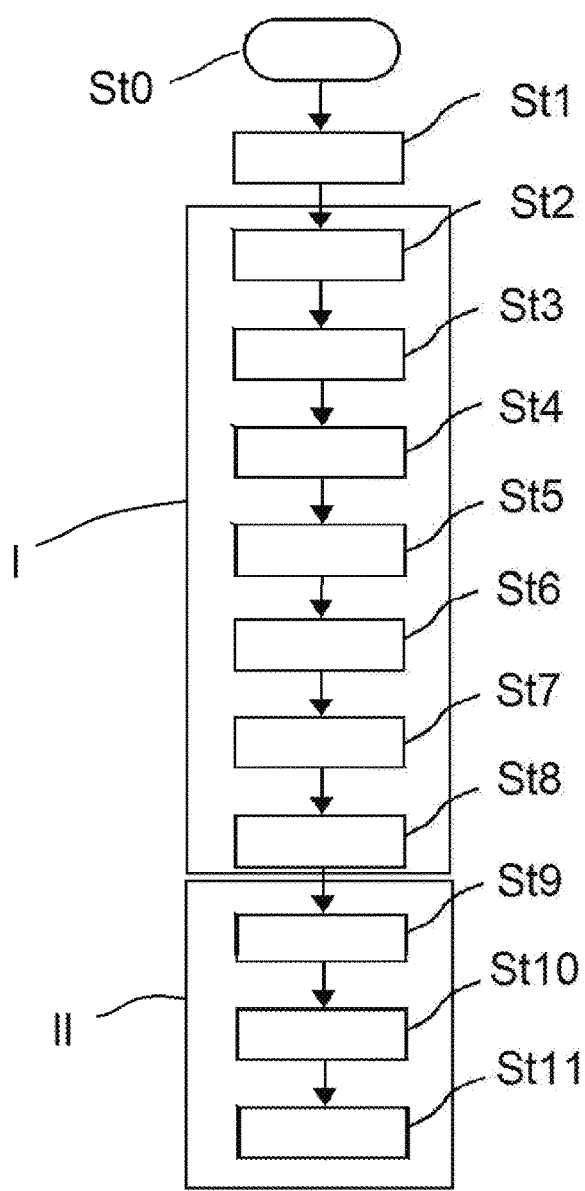

FIG. 4 a flow chart of the THz measuring procedure according to one embodiment.

A THz measuring array 1 comprises, according to the embodiments of FIGS. 1 and 2, always a portable THz measuring device 2 for measuring a measurement object 3, e.g. a plastic pipe. The portable THz measuring device 2 is depicted in FIGS. 1 and 2 by way of example in various variants.

The portable THz measuring device 2 comprises always a grip region 4 for being grabbed and handled by the user and a front end region 5 which is preferably a contact region with a shaped panel 25. According to FIG. 1, the portable THz measuring device 2 may e.g. be angled or, according to the embodiment of FIG. 2, also be designed elongated or rod-shaped. Further, the portable THz measuring device 2, according to the embodiment of FIG. 2, may be completely portable, without any data connection to a stationary unit, or, according to FIG. 1, be connected to a stationary unit via a data and power supply line 6. Moreover, e.g. a portable unit, such as shown in FIG. 2, may e.g. wirelessly transmit data to a stationary unit.

According to the block schematic diagram of FIG. 3, the portable THz measuring device 2 comprises a transmitter and receiver device 8, i.e. a transmitter and receiver dipole or, respectively, transceiver 8 which is preferably designed fully electronically, i.e. as transmitter and receiver dipole and controlled by an electronic controller unit 10. The transmitter and receiver device 8 puts out an electromagnetic beam 12, hereinafter referred to as THz transmission beam 12, in a cone of radiation 12a along an optical axis A, in particular in the frequency range of between 0.01 and 10 THz, i.e. 10 GHz and 10 THz, in particular as pulsed THz radiation or in frequency modulation. When it impacts upon an exterior surface 3a and interior surface 3b d of the measurement object 3 at an orthogonal angle, THz radiation 14 will be reflected along the optical axis A back towards to transmitter and receiver device 8 where it will be detected. Thus, a time of flight of the THz radiation from the transmitter and receiver device to the boundary surface 3a and back can be detected, and this can be correspondingly determined directly or, in the case of frequency modulation, also in the frequency domain (using Fourier transformation) and converted. Thus, from the THz measurement of the transmitter and receiver device 8, the electronic controller device 10 can determine a distance d of the transmitter and receiver device 8 from the boundary surface 3a.

In a pre-measurement I the THz transceiver 8 emits a first THz transmission beam 112 along the optical axis A, which is designed in a narrow frequency band fb1 with a bandwidth b1 of e.g. 1 GHz. In this pre-measurement I it is possible, in particular, to first determine in a searching phase Ia whether in the measurement a measurement object 3 or, respectively, an essentially orthogonal boundary surface 3a of the measurement object 3 can be detected at all by the measurement, and, subsequently, in a detection phase Ib, whether the current measuring distance d lies below a distance limit d_tres or not. If d<d_tres, then it will be detected that an allowable distance for a subsequent main measurement II exists, and the main measurement II is initiated directly or again an indicator signal is put out to indicate that the main measurement may be carried out subsequently.

In the main measurement II a THz transmission beam 212 is emitted in a second, wider frequency band fb2, e.g. with a bandwidth b2 of e.g. 20, 30 or 40 or even 1000 GHz, because the emitted THz beam 212 hits the measurement object 3 and is thereby dampened or attenuated respectively by the material of the measurement object 3, in particular by reflections and possibly also absorption. Then, in the main measurement e.g. a layer thickness d3 is determined as the distance between the exterior surface 3a and the interior surface 3b of the measurement object 3: further layer thicknesses may be determined in a corresponding fashion, in particular in the event of multi-layer pipes. Further or alternatively hereto, other geometric distances or structures may also be measured; further or alternatively hereto, spectroscopic measurements may be carried out in which, therefore, e.g. the absorption characteristics of the measurement object 3, e.g. in spatial resolution is examined.

The electronic controller unit 10 may advantageously put out output signals S2 to an output device 16, whereby the output device 16 may be e.g. an optical or even acoustic display device sein indicating the different phases Ia, Ib, II or states respectively. This can be indicated e.g. in three different indicator fields or by means of different indications on a common indicator field.

Further, preferably, the results are evaluated and compared to target values so that there is an even qualitative indication on the portable measuring device 2 or its output device 16 respectively as to whether e.g. a layer thickness has been determined which is too low or, respectively, the measuring result in general is displayed on the output device 16. In the case of spectroscopic examinations it may be displayed e.g. whether specific substances, e.g. specific chemical compounds, have been detected.

The distance limit d_tres may be adjusted in particular to the length of a shaped panel 25 of the front end region 5; thus, the shaped panel 25 may exhibit e.g. two contact contour lines 25a, 25b which, when correctly positioned, come into contact with the surface 3a of the measurement object 3. When, in the phase of pre-measurement I, a sufficient measuring signal is determined, i.e. the amplitude of the measuring signal exceeds a threshold value, and, therefore, a perpendicular measuring position has been attained, and, furthermore, the determined distance d does not exceed the distance limit d_tres, a correct contact position may be determined even without contact sensors etc., i.e. by means of the distance measurement alone, so that the phase of main measurement II is subsequently initiated.

In the phase of pre-measurement I, in particular, a measurement can be carried out within a normal range or, respectively, an assigned measuring band for such a THz distance measurement, i.e. in particular within an ISM (Industrial Scientific and Medical) band, in which measurements are permitted even without shielding or attenuation, e.g. at 24 GHz to 24,25 GHz or 122 to 123 GHz or 244 to 126 GHz.

Accordingly, in the phase of pre-measurement I the portable measuring device 2 e.g. complies with an ISM band, whereupon then, in the phase of main measurement II, a wider bandwidth is set, for a higher resolution or, respectively, for example, a more precise detection of the layer thickness or a precise spectroscopic examination.

An actuator device 18 may be provided on the THz measuring device 2, e.g. in the grip region 4, e.g. in the form of a push button or switch, by means of which the user initiates the measurement. FIG. 4 shows, by way of example, a measuring procedure according to an embodiment of the invention:

Following the start in step St0 the user grabs the grip region 4 in step St1 and brings the measuring device 2 into the direction towards the measurement object 3.

For initiating the phase of pre-measurement the user actuates the actuator device 18 in step St2 and gives a actuation signal S1 or starting signal respectively
so that, subsequently, in step St3, the controller device 10 puts out control signals S2 to the THz transceiver 8 and initially starts a pre-measurement I, in particular a searching phase Ia, using the first THz transmission beam 112 with lower bandwidth b1, whereby the THz transceiver 8 generates measuring signals S3.

The controller device 10 receives the measuring signals S3 and determines,
in step St4, whether a measurement object 3 has been detected already (searching phase Ia)
in step St5, if the measurement object 3 or, respectively, its boundary surface 3a, has been detected, the current distance d and
in step St6, whether the current distance d lies above the distance limit d_tres (detection phase Ib).
and indicates the determined phase by means of indicator signals S3 on a display device 16. Hereby, e.g. the measuring signal may be displayed also on a scale for the measuring distance d.

Thus, the user knows that he possibly may have to position the measuring device 2 closer to the measurement object 3 or e.g. the measuring device 2 is at an odd angle. Thus, in step St7, the user brings the portable THz measuring device 2 towards the measurement object 3 in a position sufficiently close and correct, e.g. up to full contact of the shaped panel 25 or, respectively, the contour lines 25a, 25b to the exterior surface 3a,
so that, in step St8, the controller device 10 detects that the current distance d does not exceed the distance limit d_tres, and
in step St9, the main measurement II is commenced immediately, or it is indicated to the user that he may subsequently initiate a main measurement II via the actuator device 18.

In the main measurement II, in step St10, a more precise examination using the second THz transmission beam 212 with a wider bandwidth is carried out, e.g. a precise determination of the layer thickness d3 or another geometric property or e.g. a precise spectroscopic examination, which is put out in step St11, e.g. on the display device 16.

Further, besides measurements of layer thicknesses or wall thicknesses respectively, general structural examinations or examinations of the geometric composition may be carried out, as well as spectroscopic examinations, in which e.g. chemical substances are detected based on their spectroscopic absorption characteristics.

LIST OF REFERENCE NUMERALS

1 THz measuring array
2 portable THz measuring device
3 measurement object, e.g. plastic pipe
3a exterior surface of the measurement object 3
3b interior surface of the measurement object 3
4 grip region
5 front end region, preferably contact region
8 THz transceiver, e.g. transmitter and receiver dipole
10 electronic controller device
12 THz transmission beam
12a cone of radiation emitted
112 first THz transmission beam of pre-measurement
212 second THz transmission beam of main measurement, i.e. main measurement transmission beam
14 reflected THz radiation
16 output device
18 actuating device
25 shaping panel of front end region 5
25a, 25b contact contour lines
A optical axis
b1 first, smaller bandwidth of e.g. 1 GHz, narrower first frequency band of pre-measurement
b2 second, larger bandwidth, e.g. 20, 30, or 40 GHz, wider second frequency band, of main measurement
d distance of THz transceiver 8 from boundary surface 3a
d_tres boundary surface
d3 layer thickness
e1 first indication, e.g. for searching phase Ia
e2 second indication, e.g. for detection phase Ib
I phase of pre-measurement
Ia searching phase for detecting the measurement object 3
Ib detection phase
II phase of main measurement
S1 actuating signal
S2 control signal
S3 measuring signal
S4 output signals to output device 16
St1 through St11 steps of the procedure

The invention claimed is:

1. A method for THz measuring a measurement object, comprising at least the following steps:
phase of a pre-measurement,
determining whether a measurement object has been detected, if the measurement object has been detected, determining a current distance of the THz measuring devices or the THz transceiver from the boundary surface, comparing the determined current distance with a distance limit, and if the distance limit has not been exceeded, subsequently initiating a main measurement or indicating the initiation of the main measurement, phase of the main measurement in which a main measurement THz transmission beam having a main measurement bandwidth is emitted along an optical axis towards the measurement object and reflected THz radiation is detected, whereby, using the emitted main measurement THz transmission beam and the detected reflected THz radiation, a measurement of geometric characteristics or material characteristics of the measurement object is carried out, putting out the measurement result, wherein in the phase of pre-measurement a first THz transmission beam of the THz transceivers of the THz measuring devices is emitted, in a first frequency range and having a first bandwidth, along the optical axis towards measurement object and THz radiation reflected off of a boundary surface of the measurement object is detected, and in the phase of main measurement the main measurement transmission beam is emitted as second transmission beam, whereby the main measurement bandwidth of the main measurement transmission beam is larger than the first bandwidth.

2. The method of claim 1, wherein the measuring device is portable and held and handled by a grip region, whereby it is being positioned such that the front end region is in front of or on the measurement object.

3. The method of 2, wherein the portable THz measuring device is placed by the user by a contact surface formed at the front end region, the contact surface including a shaped panel, against a boundary surface of the measurement object so as to not exceed the distance limit.

4. The method of claim 1, wherein the phase of pre-measurement and/or the phase of main measurement is initiated by actuating an actuation device, which includes a button or switch.

5. The method of claim 1, wherein the phases or a part of the phases are indicated on a display device and/or output by means of an optical display device, in particular as an optical signal.

6. The method of claim 1, wherein in the phase of main measurement when measuring the measurement object using the main measurement THz transmission beam, a measurement of geometric characteristics is carried out, in particular of a layer thickness between boundary surfaces of the measurement object is determined.

7. The method of claim 1, wherein in the phase of main measurement when measuring the measurement object using the main measurement THz transmission beam, a material analysis of the measurement object is carried out, which includes a spectroscopic analysis, which includes a spatially resolved spectroscopic analysis of the measurement object.

8. The method of claim 1, wherein the phase of main measurement is initiated automatically upon determination that the distance limit has not been exceeded.

9. The method of claim 1 wherein in the phase of pre-measurement the THz transmission beam is emitted continuously for continuous detection of measuring objects and comparison of a current measuring distance to the distance limit.

10. The method of claim 1, wherein in the phase of main measurement another frequency range is emitted than the one in the phase of pre-measurement.

11. The method of claim 1, wherein in the phase of main measurement another intensity is emitted than the one in the phase of pre-measurement.

12. A THz measuring device for measuring a measurement object, the THz measuring device comprising:
a THz transceiver for emitting THz radiation along an optical axis and receiving reflected THz radiation,
a controller device for collecting measurement signals of the THz transceiver and determining a distance and a measurement result of the measurement object, and
an output device for putting out a measurement result,
wherein the THz measuring device is portable and comprises a grip region for being grabbed and handled by a user, the controller device being configured for a phase of pre-measurement and a phase of main measurement,
the controller device being configured to emit, in the phase of main measurement a main measurement THz transmission beam having a main measurement bandwidth along the optical axis,
the controller device determining in the pre-measurement whether a measurement object has been detected and, if the measurement object has been detected, determining the distance of the THz measuring devices or the THz transceiver from a boundary surface of the measurement object and
comparing the same with a distance limit and, depending on the comparison, initiates or indicates the main measurement when the distance limit has not been exceeded, and
the controller device being configured to determine measurement characteristics of the measurement object in the main measurement
wherein the THz measuring device is configured to emit, in phase of pre-measurement, the THz radiation as a first THz transmission beam along the optical axis having a first bandwidth, and, in the phase of main measurement to emit the main measurement THz transmission beam as a second THz transmission beam having the main measurement bandwidth along the optical axis,
the main measurement bandwidth being wider than the first bandwidth, for a higher resolution.

13. The THz measuring device of claim 12, wherein the controller device is configured to determine, in the main measurement geometric characteristics and/or material characteristics of the measurement object which includes the layer thickness as the distance between two boundary surfaces and/or material characteristics by means of spectroscopic analysis.

14. The THz measuring device of claim 12, wherein it comprises an output device for acoustic or optical output or indication of the phases, in particular of the pre-measurement for correcting the positioning by the user.

15. The THz measuring device of claim 12, wherein it comprises a shaped panel at its front end region having contour lines, in particular pairs or arc-shaped contour lines, for being placed in contact with the exterior surface of the measurement object, in particular a pipe, whereby, when the contour lines are in contact with the exterior surface of the measurement object, the current distance is below the distance limit.

16. The THz measuring device claim 12, wherein it is self-sufficient or connected to a stationary unit wirelessly or via a flexible data and power link, for handling and for adjusting the distance by the user.

17. The THz measuring device of claim 12, wherein the THz radiation lies in the frequency range of between 0.01 and 10 THz.

18. The THz measuring device of claim 12, wherein the THz transceiver is designed to be fully electronic, in particular as a transmitter and receiver dipole, e.g. using frequency modulation or pulsed radiation, wherein main measurement using the wider main measurement bandwidth, a higher resolution of the measurement result can be generated so as to make a more precise determination of measured characteristic of the measurement object, which includes a layer thickness or spectroscopic analysis.

\* \* \* \* \*